United States Patent
Smyth et al.

(10) Patent No.: US 11,140,321 B2
(45) Date of Patent: Oct. 5, 2021

(54) INCREASING SENSITIVITY OF A PROBE SENSOR FOR LENS POSITION

(71) Applicant: Apple Inc., Cupertino, CA (US)

(72) Inventors: Nicholas D. Smyth, San Jose, CA (US); Scott Wallace Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/583,167

(22) Filed: Sep. 25, 2019

(65) Prior Publication Data

US 2020/0106962 A1 Apr. 2, 2020

Related U.S. Application Data

(60) Provisional application No. 62/739,111, filed on Sep. 28, 2018.

(51) Int. Cl.
| | |
|---|---|
| *H04N 5/232* | (2006.01) |
| *H04N 5/225* | (2006.01) |
| *G02B 27/64* | (2006.01) |
| *G03B 5/02* | (2021.01) |
| *G03B 13/36* | (2021.01) |
| *G02B 7/09* | (2021.01) |

(52) U.S. Cl.
CPC ............ *H04N 5/23258* (2013.01); *G02B 7/09* (2013.01); *G02B 27/646* (2013.01); *G03B 5/02* (2013.01); *G03B 13/36* (2013.01); *H04N 5/2254* (2013.01); *H04N 5/23287* (2013.01); *G03B 2205/0015* (2013.01); *G03B 2205/0069* (2013.01)

(58) Field of Classification Search
CPC ............ H04N 5/23258; H04N 5/2254; H04N 5/23287; H04N 5/2253; G02B 27/646; G02B 7/09; G03B 5/02; G03B 13/36; G03B 2205/0069; G03B 2205/0015; G01B 7/003
See application file for complete search history.

(56) References Cited

U.S. PATENT DOCUMENTS

| | | | |
|---|---|---|---|
| 9,541,369 B2 | 1/2017 | Enomoto et al. | |
| 9,995,904 B2 | 6/2018 | Lee et al. | |
| 2016/0033786 A1* | 2/2016 | Kim | G02B 13/001 359/557 |

(Continued)

FOREIGN PATENT DOCUMENTS

| | | |
|---|---|---|
| CN | 104614916 | 5/2015 |
| EP | 3373058 | 12/2018 |
| KR | 20170138672 | 12/2017 |

OTHER PUBLICATIONS

Office action from Chinese Application No. 201910923470.8, dated Mar. 29, 2021, (English translation and Chinese Version), pp. 1-44.

*Primary Examiner* — Jason A Flohre
(74) *Attorney, Agent, or Firm* — Robert C. Kowert; Kowert, Hood, Munyon, Rankin & Goetzel, P.C.

(57) ABSTRACT

Increases to the sensitivity of a probe magnet sensor are implemented for a camera lens. Probe magnet sensors may be located on carrier of a surface of an actuator coil to reduce the distance between the probe magnet sensor and a probe magnet mounted on an optics component that includes the camera lens. A probe magnet may be located within the camera so that the flux region of the probe magnet does not overlap with a flux region of a drive magnet for an actuator of the camera.

20 Claims, 9 Drawing Sheets

(56) References Cited

U.S. PATENT DOCUMENTS

| | | |
|---|---|---|
| 2016/0209672 A1 | 7/2016 | Park et al. |
| 2016/0231528 A1* | 8/2016 | Wong .................. G02B 7/36 |
| 2018/0039161 A1* | 2/2018 | Moto .................. G02B 7/08 |
| 2018/0115715 A1 | 4/2018 | Jung et al. |
| 2018/0239217 A1 | 8/2018 | Konuma et al. |
| 2018/0329170 A1* | 11/2018 | Huang .................. G01D 5/145 |

* cited by examiner

INCREASING SENSITIVITY OF A PROBE SENSOR FOR LENS POSITION

RELATED APPLICATIONS

This application claims benefit of priority to U.S. Provisional Application Ser. No. 62/739,111, entitled "INCREASING SENSITIVITY OF A PROBE SENSOR FOR LENS POSITION," filed Sep. 28, 2018, and which is incorporated herein by reference in its entirety.

BACKGROUND

Technical Field

This disclosure relates generally to control of the motion of camera components.

Description of the Related Art

Cameras may incorporate mechanisms to move an optical lens for the camera in order to implement different features. A camera may incorporate optical image stabilization (OIS) mechanisms that may sense and react to external excitation or disturbance by adjusting location of the optical lens on the X and/or Y axis in an attempt to compensate for unwanted motion of the lens. Cameras may incorporate an autofocus (AF) mechanism whereby the object focal distance can be adjusted to focus an object plane or field in front of the camera at an image plane to be captured by an image sensor.

Location information of the optical lens may be used to adjust the location of the optical lens to implement the above features. A camera may include a probe magnet sensor (also referred to herein as a position sensor) for the optical lens to determine a current location of the optical lens according to changes in a flux region emitted by a probe magnet included in the camera.

SUMMARY OF EMBODIMENTS

A camera may include an actuator for controlling the position of an optics component (which may include one or more optical lenses) relative to the image sensor of the camera along three axes, one of which is the optical (Z) axis of the camera, and two of which (X, Y) are orthogonal to the optical (Z) axis. The actuator may include a focusing mechanism for the camera, moving the optics component along the optical (Z) axis to provide manual or autofocus (AF) capabilities. The actuator may provide optical image stabilization (OIS) for the camera to move the optical component along the axes (X or Y) orthogonal to the optical (Z) axis.

The camera may include a position sensor placed within a flux region of a probe magnet mounted to the optical component. The position sensor may be placed on a coil of the actuator to decrease the distance between the position sensor and the probe magnet. The probe magnet may be placed at location in the camera so that the flux region of the camera does not overlap with flux regions of drive magnets of the actuator in the camera.

Figure 1A:
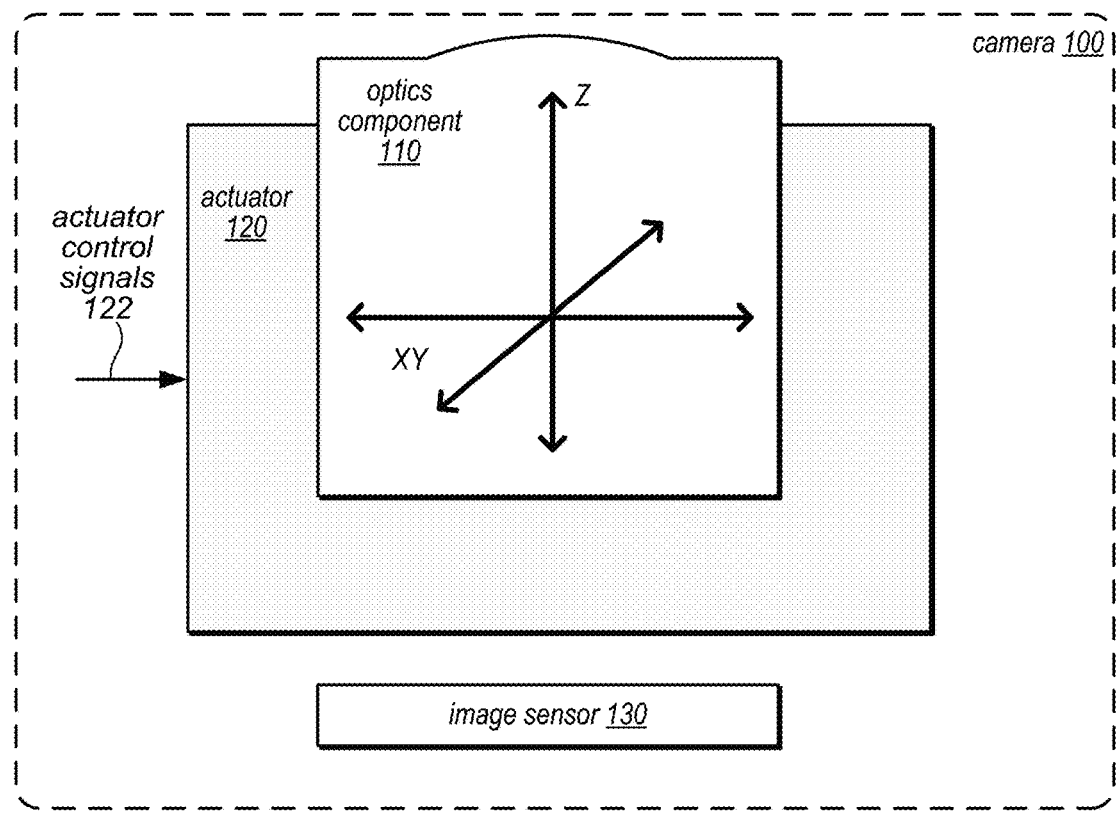
FIG. 1A illustrates motion of an optics component by an actuator in a camera, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of increasing sensitivity for a probe magnet sensor are described herein. In various embodiments, a camera may implement an actuator for controlling motions of an optics component, which may include one or more lenses, relative to an image sensor within the camera. For example, in some embodiments, the actuator may provide optical image stabilization (OIS) for the camera. Likewise, in some embodiments, the actuator may also include an autofocus (AF) mechanism for moving the optics component along an optical (Z) axis within the optics assembly. In order to determine how to move the optics component, a probe magnet sensor (also referred to herein as a position sensor) may be implemented various embodiments.

A probe magnet sensor may sense a change in location of the optics component according to a probe magnet mounted on the optics component. As the probe magnet moves along with the optics component, the magnetic flux region of the probe magnet may move correspondingly. The probe magnet sensor may detect the movement of the magnetic flux region in order to determine a movement of the probe magnet and thus the optics component.

Sensitivity of the probe magnet sensor may depend, in some embodiments, on a distance between the probe magnet sensor and a probe magnet. As the distance increases, the flux region of the probe magnet may attenuate, making smaller changes in the flux region more difficult to detect. In various embodiments, such as discussed below with regard to FIGS. 3A-3B, probe magnet sensor placement to decrease the distance between the probe magnet sensor and probe magnet may be implemented such that the relative field strength of the probe magnet as detected by the position may be increased by a ratio of 10:1.

Sensitivity of the probe magnet sensor may depend, in some embodiments on strength of the probe magnet. A stronger probe magnet may have a larger flux region which may reduce attenuation effects upon the probe magnet sensor even at greater distances from the probe magnet. In various embodiments, such as discussed below with regard to FIG. 6, a stronger probe magnet may be implemented.

FIG. 1A illustrate motion of an optics component 110 by an actuator 120, which may both be within a camera 100 that also includes an image sensor 130, according to at least some embodiments.

As shown in FIG. 1A, an actuator 120 may provide optical image stabilization (OIS) for the optics component 110. In at least some embodiments, the actuator 120 may implement a voice coil motor (VCM) actuator. An actuator 120 such as an OIS VCM actuator may provide motion to optics component 110 in the XY plane. In addition, in some embodiments, motion may also be provided to optics component 110 on the Z (optical) axis, for example by an AF mechanism of the actuator 120 for moving the optics component 110 along the optical (Z) axis within the actuator 120. The XY plane motion is, for example, for optical image stabilization (OIS) relative to image sensor 130 in camera 100. The Z axis motion may be, for example, for focusing or AF purposes in a camera that incorporates an AF mechanism to provide optical focusing relative to image sensor 130.

Actuator 120 may cause movements of optics component 110 responsive to actuator control signals 122. A controller (not illustrated) may determine movements for optics component 110 in order to provide OIS and AF features. Actuator control signals 122 may be received from a controller implemented as part of camera 100 (e.g., firmware or other program instructions executing on one or more processors on camera 100 or dedicated circuitry, such as an Application Specific Integrated Circuit (ASIC) or Field Programmable Gate Array (FPGA), in some embodiments. In some embodiments, actuator control signals 122 may be received from a connected device, such as a portable multifunction device that includes camera 100 and implements a controller (e.g., as part of an application, such as a camera application, executing on device processor(s) or on dedicated circuitry (e.g., an image processing pipeline implemented on an ASIC that may determine actuator control signals 122 as part of processing image data captured by camera 100).

Actuator control signals 122 may be determined in part using a current location of optics component 110 determined from one or more position sensors. For instance, input may be received to focus on an object within the object field of camera 100 from a user (e.g., via a touch or other input designating the object for focus). Actuator control signals 122 may have to be determined in order to move optics component 110 to focus on the object using a current location of the optics component 110 determine from the one or more position sensors in order to determine how to move the optics component 110.

Figure 1B:
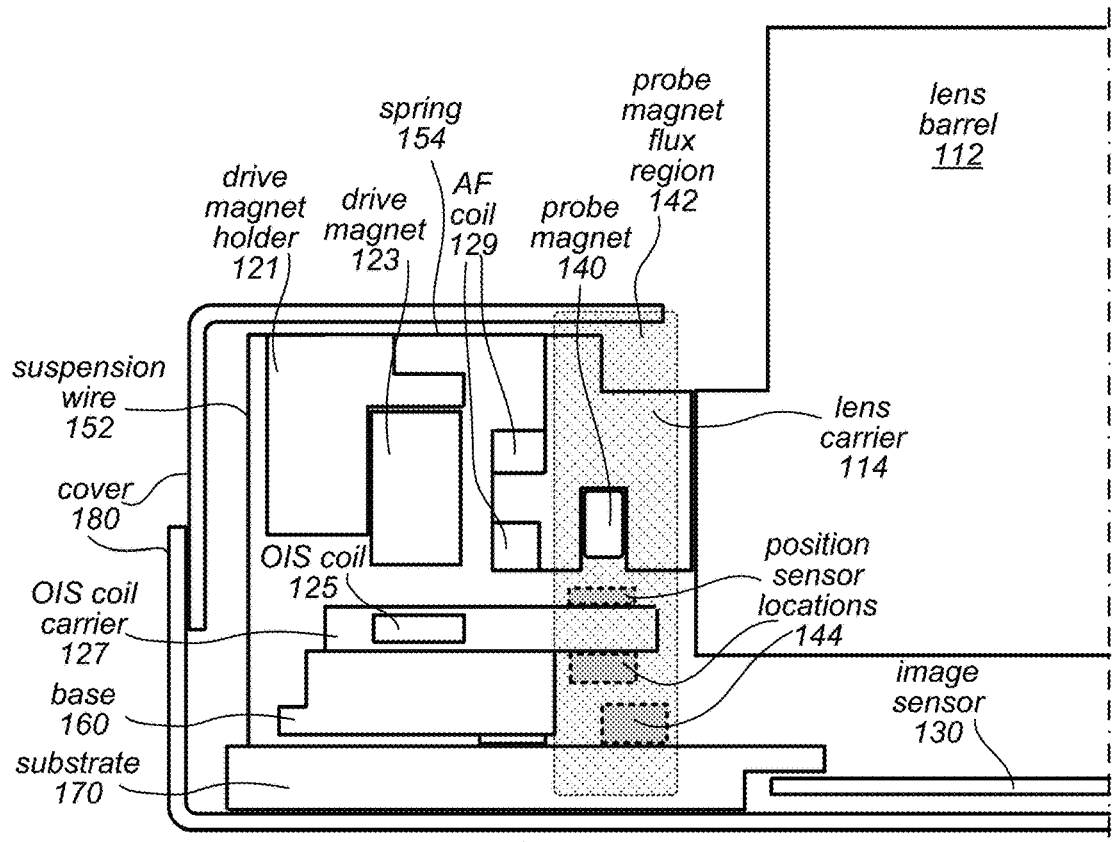
FIG. 1B illustrates a detailed view of an actuator, optics component, and image sensor of a camera that implements a probe magnet and position sensor to locate the optics component when moved by the actuator, according to some embodiments.

FIG. 1B illustrates a detailed view of an actuator, optics component, and image sensor of a camera that implements a probe magnet and position sensor to locate the optics component when moved by the actuator, according to some embodiments. Optics component 110 may include lens barrel 112 and lens carrier 114, in some embodiments. Lens barrel 112 may include one or more lenses through which light may be received and projected onto image sensor 130, positioned below lens barrel 112. Lens carrier 114 may be bonded or otherwise attached to lens barrel 114 so that as movements are caused by components of actuator 120 to lens carrier 114, lens barrel 112 is moved correspondingly.

As noted above, actuator 120 may be a voice coil motor, in some embodiments. Coils, such as AF coil 129, and OIS coil 125, may be implemented to cause movement of optics component 110. For example, when an electric current is applied to a loop of wires that make up a coil, Lorentz forces are generated which push against a magnetic force generated by a drive magnet, such as drive magnet 123. The direction of the current applied to the coil may change the way Lorentz forces push against the magnet force generated by a drive magnet so that directional changes can be made along an axis.

As illustrated in FIG. 1B, drive magnet holder 121 carries or supports drive magnet 123. AF coil 129 is positioned on lens carrier 114 in order to generate Lorentz forces to push against the magnetic force of drive magnet 123 to move lens carrier 114 (and thus lens barrel 112) along the optical (Z) axis. Lens carrier 114 is suspended above image sensor 130 by spring 154 which may flex to support the movement along the optical (Z) axis.

As illustrated in FIG. 1B, OIS coil 125 may be embedded within OIS coil carrier 127 and may be positioned to generate Lorentz forces to push against the magnetic force of drive magnet 123 to move lens carrier 114 (and thus lens barrel 112) along an axis (X or Y) orthogonal to the optical (Z) axis). In other embodiments, OIS coil 125 may be mounted on a surface of OIS coil carrier 127. Drive magnet holder 121 (and thus drive magnet 123) and lens carrier 114 (and thus lens barrel 112) may be suspended by spring 154 which may be attached to suspension wire 152. Suspension wire 152 may flex in the axes (X or Y) orthogonal to the optical (Z) axis to support movement of the lens carrier 114 along the axes (X or Y) orthogonal to the optical (Z) axis).

Probe magnet 140 may be mounted to a surface of optics component 110, such as lens carrier 114 as illustrated in FIG. 1B, in some embodiments. Probe magnet 140 may emit a probe magnet flux region 142 which can be detected by a position sensor within probe magnet flux region. In at least some embodiments, a flux region may be an area around a magnet in which the field strength created by that magnet is at least some percentage (e.g., 10% or 1%) of the magnet's maximum field strength. Different position sensor locations 144 are discussed in detail below, which may include mounting the position sensor on a substrate 170 that is within camera cover 180, or on a surface of OIS coil carrier 127 (which may be supported upon base 160 and substrate 170).

Please note that FIG. 1B provides a cross section view of a portion of a camera like camera 100. As discussed below with regard to FIGS. 4-6, different numbers and arrangements of drive magnets (and other actuator components, such as OIS coils, AF coils, springs, and suspension wires) may be implemented in various embodiments.

Figure 2:
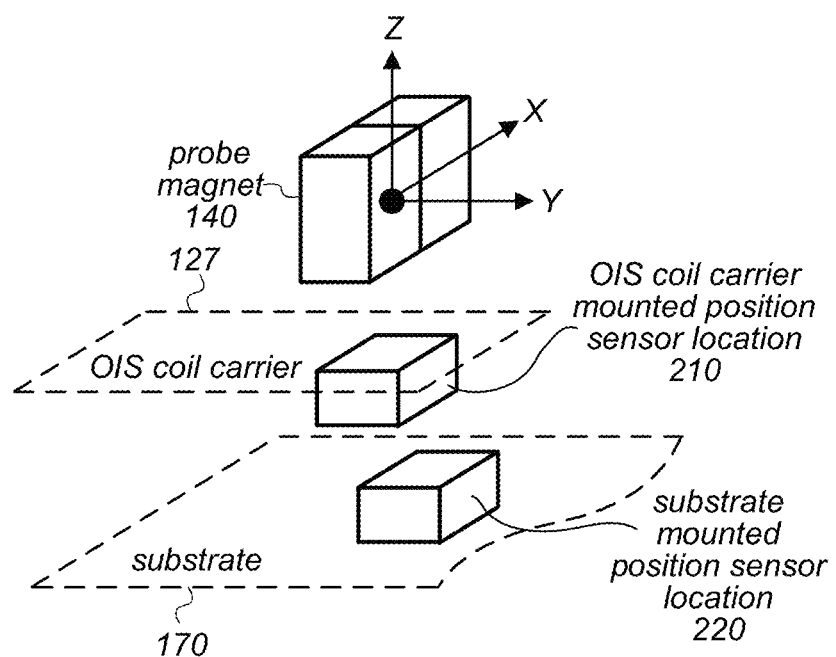
FIG. 2 illustrates probe magnet movement and position sensor locations in a camera, according to some embodiments.

A position sensor may detect a current location of an optics component according to movement of a probe magnet flux region. In some embodiments, a position sensor may be a Hall effect sensor. In other embodiments, a position sensor may be a tunnel magnetoresistance (TMR) sensor. FIG. 2 illustrates probe magnet movement and position sensor locations in a camera, according to some embodiments.

Probe magnet 140 may move as the optics component 110 on which it is mounted moves. Thus as illustrated in FIG. 2, probe magnet may move along one or more of the X, Y, or Z axes. In order to detect this movement, different locations for the position sensor may be utilized. For example, in some embodiments, a position sensor may be mounted 210 on OIS coil carrier 127. OIS coil carrier mounted positions may be beneficial in cameras where a number of position sensors are desirable such that probe magnets corresponding to the position sensor may have flux regions that overlap with other magnets, like drive magnets discussed below with regard to FIGS. 4 and 5. Because of the smaller distance between the position sensor 210 on OIS coil carrier 127, the sensitivity of the position sensor may be greatly increase (e.g., up to 8:1) over further placements like a substrate 170 location 220.

Figure 3A:
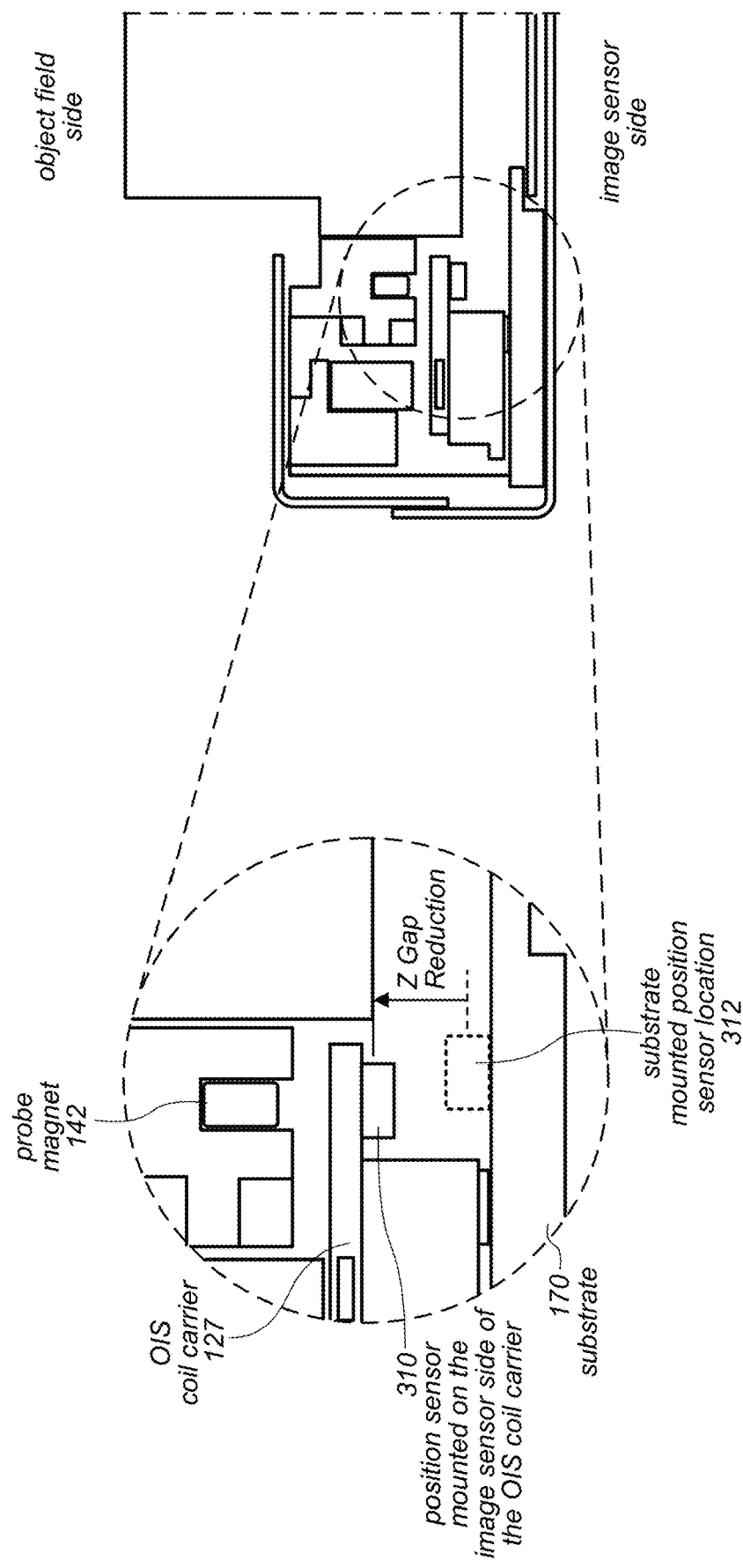
FIGS. 3A and 3B illustrate position locations mounted on a surface of an OIS coil carrier, according to at least some embodiments.

FIG. 3A illustrates one example OIS coil carrier placement for a position sensor according to some embodiments. Position sensor 310 may be mounted on the image sensor side of the OIS coil carrier 127, which may achieve a Z axis gap between the position sensor 310 and probe magnet 142 that is reduced with respect to a substrate mounted position sensor location 312.

Figure 3B:
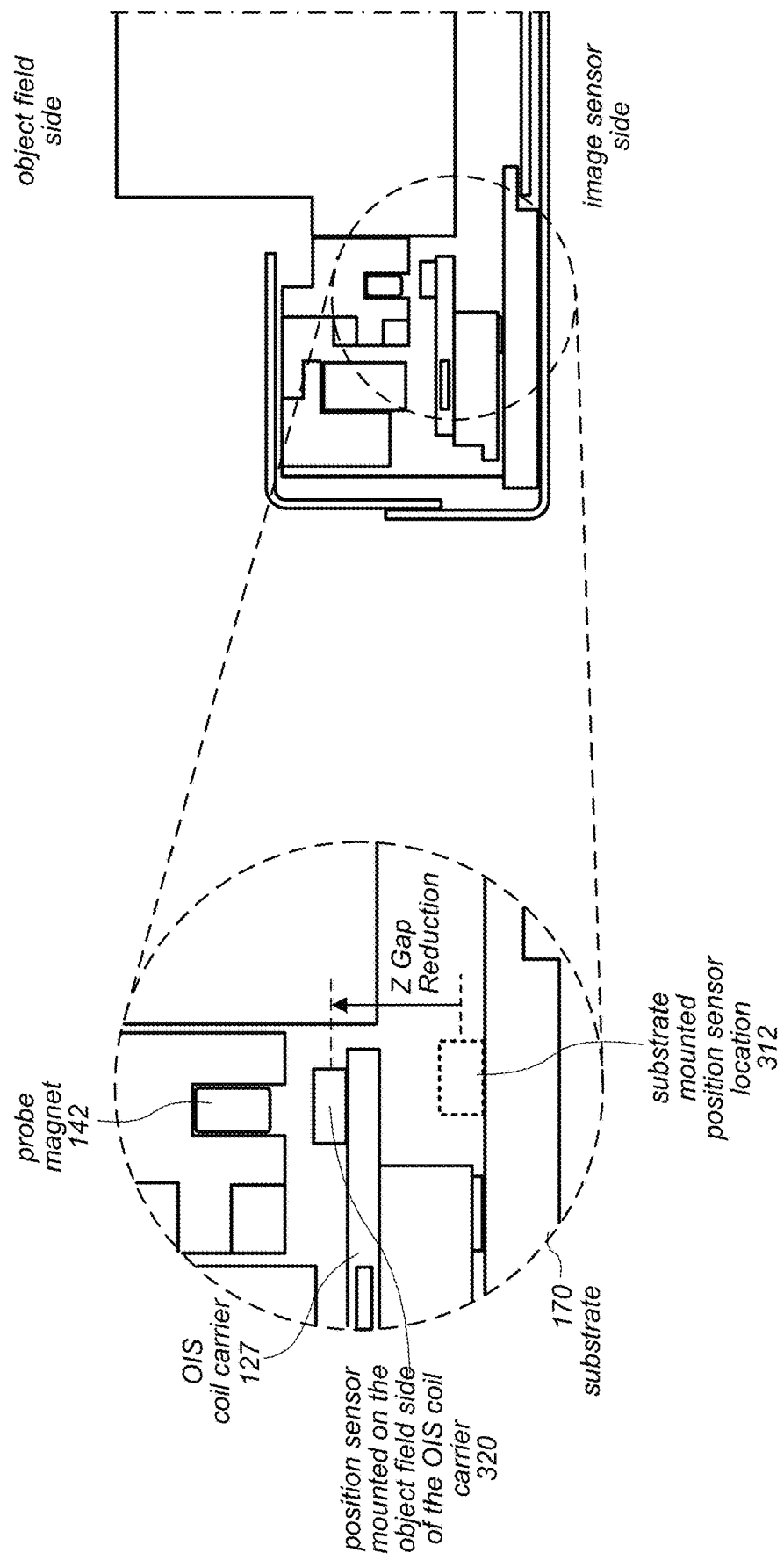

FIG. 3B illustrates one example OIS coil carrier placement for a position sensor according to some embodiments. Position sensor 320 may be mounted on the object field side of the OIS coil carrier 127, which may achieve a Z axis gap between the position sensor 310 and probe magnet 142 that is further reduced with respect to a substrate mounted position sensor location 312 and a position sensor mounted on the image sensor side of the OIS coil carrier 127 in FIG. 3A.

Different considerations for selecting between OIS coil carrier 127 surface positions 310 or 320 may include the available space above or below OIS coil carrier 127. If, for instance a base 160 height leaves little room for a position sensor on the image sensor side of the OIS coil carrier 127 and substrate 170, then an object field side of OIS coil carrier 127 may be a more optimal choice.

Alternative to OIS coil carrier mounted position sensor locations, a substrate mounted position sensor location 220 in FIG. 2 may be implemented in some embodiments. In such scenarios, arrangements of drive magnets as discussed below with regard to FIG. 7, may be implemented to increase the strength of the probe magnet and provide an increase in sensitivity for the position sensor even though it is located on substrate 170 instead of OIS coil carrier 127. Considerations for selecting substrate mounted position sensor location 220 may include a lack of interior space in the Z direction to mount the position sensor without inhibiting movement of the optical component. In some embodiments, interior space in the may be available but a means of providing power and signal lines to the sensor on the OIS oil carrier 127 may not be optimal or achievable. In such scenarios, a substrate mounted position sensor location 220 combined within an increase probe magnet strength may still provide an increased sensitivity for the position sensor.

Figure 4:
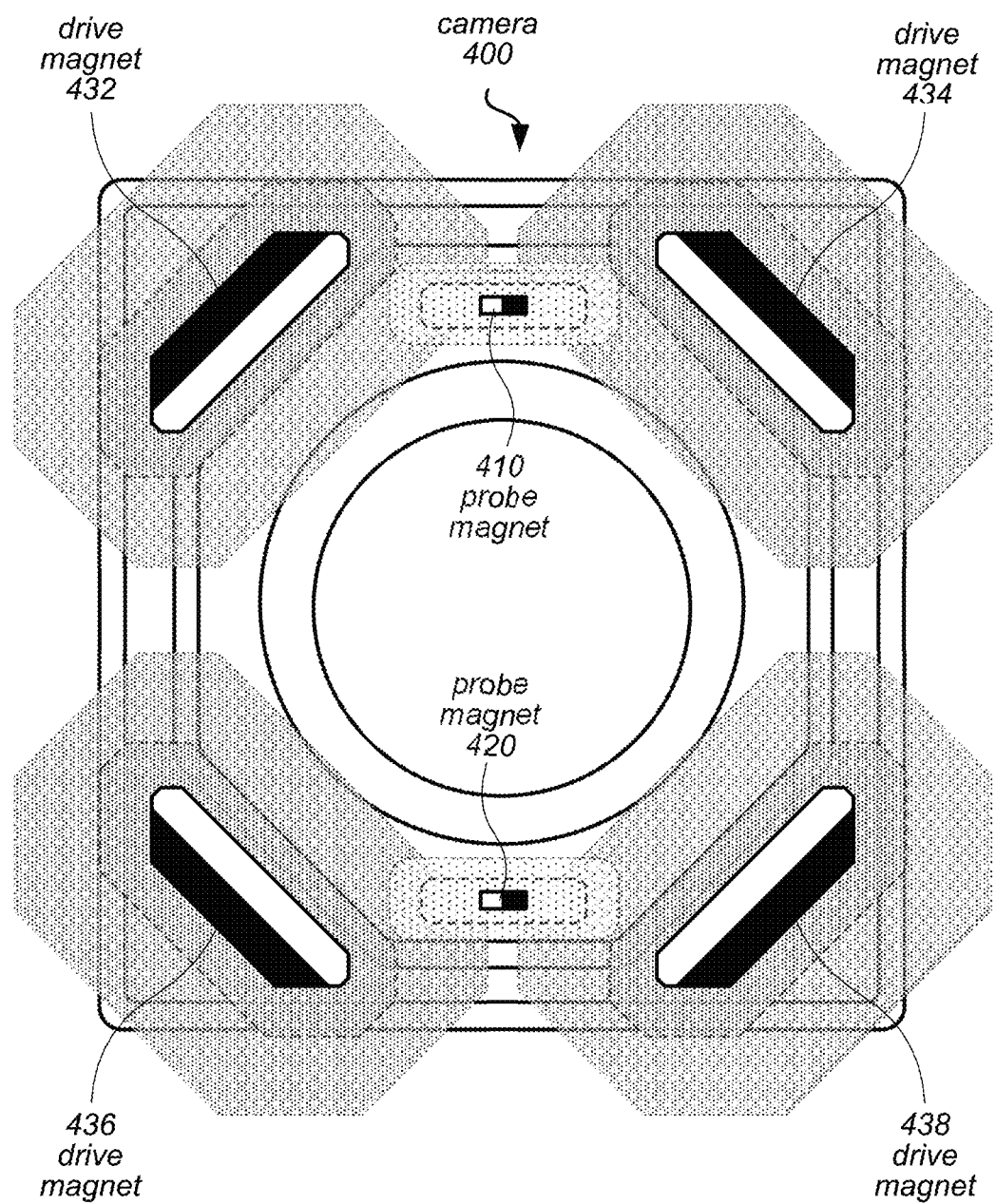
FIGS. 4-6 illustrate example arrangements of drive magnets and probe magnets of an actuator in a camera, according to at least some embodiments.

FIG. 4 illustrates an example arrangement of drive magnets and probe magnets of an actuator in a camera, according to at least some embodiments. Camera 400 may be a square-shaped (or near square-shaped) device that includes for corners. Drive magnets to perform movements of an optical component of camera 400 along the X, Y, or Z axes may be implemented at an angle with respect to the four corners of camera 400, as illustrated by drive magnets 432, 434, 436, and 438. In this way, a combination of forces provided by respective OIS coils and AF coils for drive magnets 432, 434, 436, and 438 can push against drive magnets 432, 434, 436, and 438 to cause the movements along the X, Y, or Z axes.

Multiple probe magnets 410 and 420 may be implemented for camera 400 to allow corresponding position sensors for each probe magnet to detect changes in the flux region of probe magnets 410 and 420 in order to determine a current location of the optics component 110. For example, probe magnet 410 is located on a side of camera 400 between two drive magnets 432 and 434 that is opposite to the side of probe magnet 420 placed between drive magnets 436 and 438. As illustrated in FIG. 4, flux regions of probe magnets 410 and 420 may overlap with the neighboring drive magnets. However, even in such a scenario, increased sensitivity may be achieved for a probe magnet sensor implemented with respect to probe magnets 410 and 420 utilizing an OIS coil carrier placement as discussed above with regard to FIGS. 3A and 3B.

Figure 5:
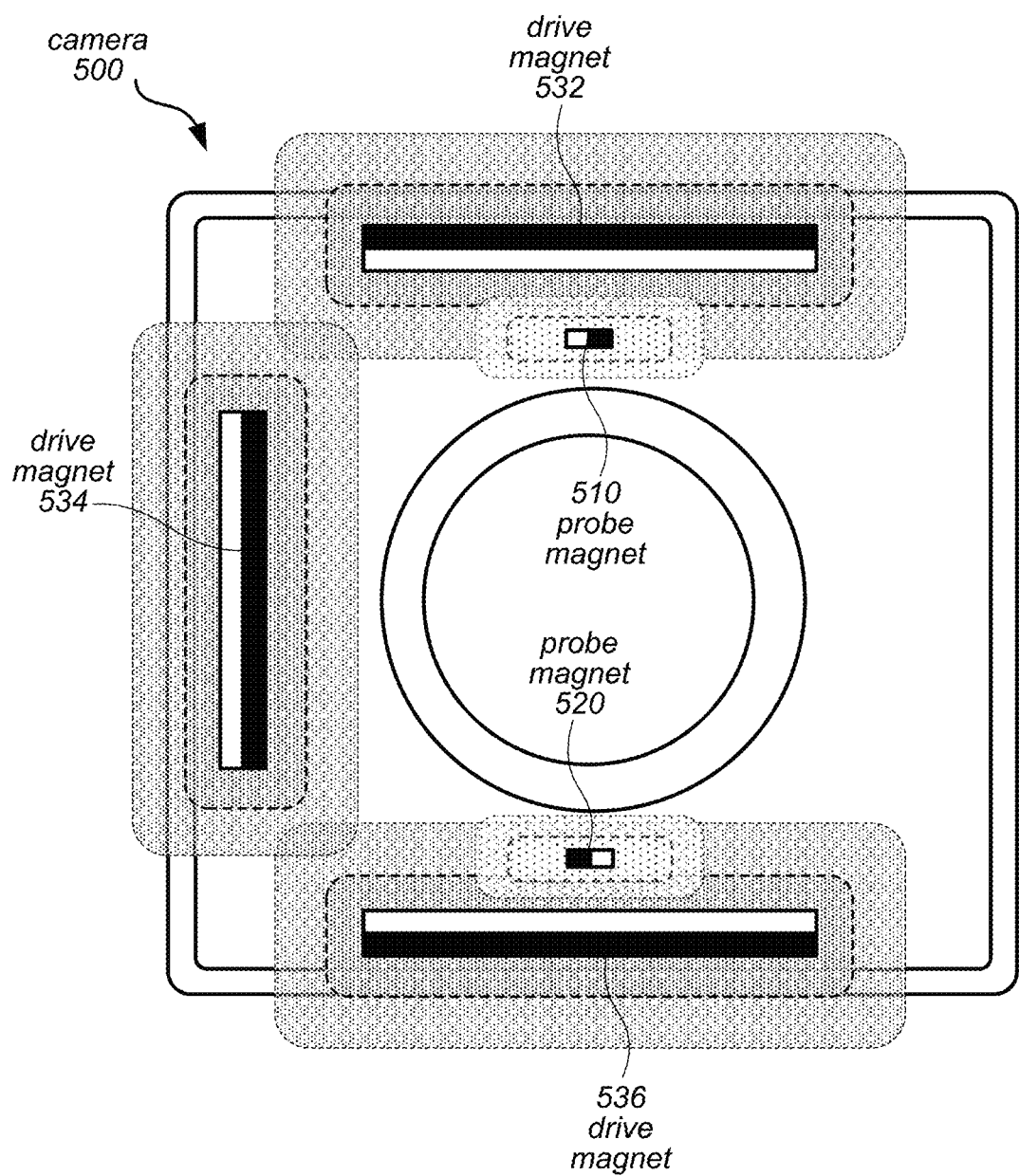

FIG. 5 illustrates an example arrangement of drive magnets and probe magnets of an actuator in a camera, according to at least some embodiments. Camera 500 may be a square-shaped (or near square-shaped) device that includes for corners. Drive magnets to perform movements of an optical component of camera 500 along the X, Y, or Z axes may be implemented along three different sides of camera 500, as illustrated by drive magnets 532, 534, and 536. In this way, a combination of forces provided by respective OIS coils and AF coils for drive magnets 532, 534, and 536 can push against drive magnets 532, 534, and 536 to cause the movements along the X, Y, or Z axes.

Multiple probe magnets 510 and 520 may be implemented for camera 500 to allow corresponding position sensors for each probe magnet to detect changes in the flux region of probe magnets 510 and 520 in order to determine a current location of the optics component 110. For example, probe magnet 510 is located on a same side of camera 500 as a drive magnet 532 that is opposite to the side of probe magnet 520 placed on a same side as drive magnet 536. As illustrated in FIG. 5, flux regions of probe magnets 510 and 520 may overlap with the neighboring drive magnets. However, even in such a scenario, increased sensitivity may be achieved for position sensors implemented with respect to probe magnets 510 and 520 utilizing an OIS coil carrier placement as discussed above with regard to FIGS. 3A and 3B.

Figure 6:
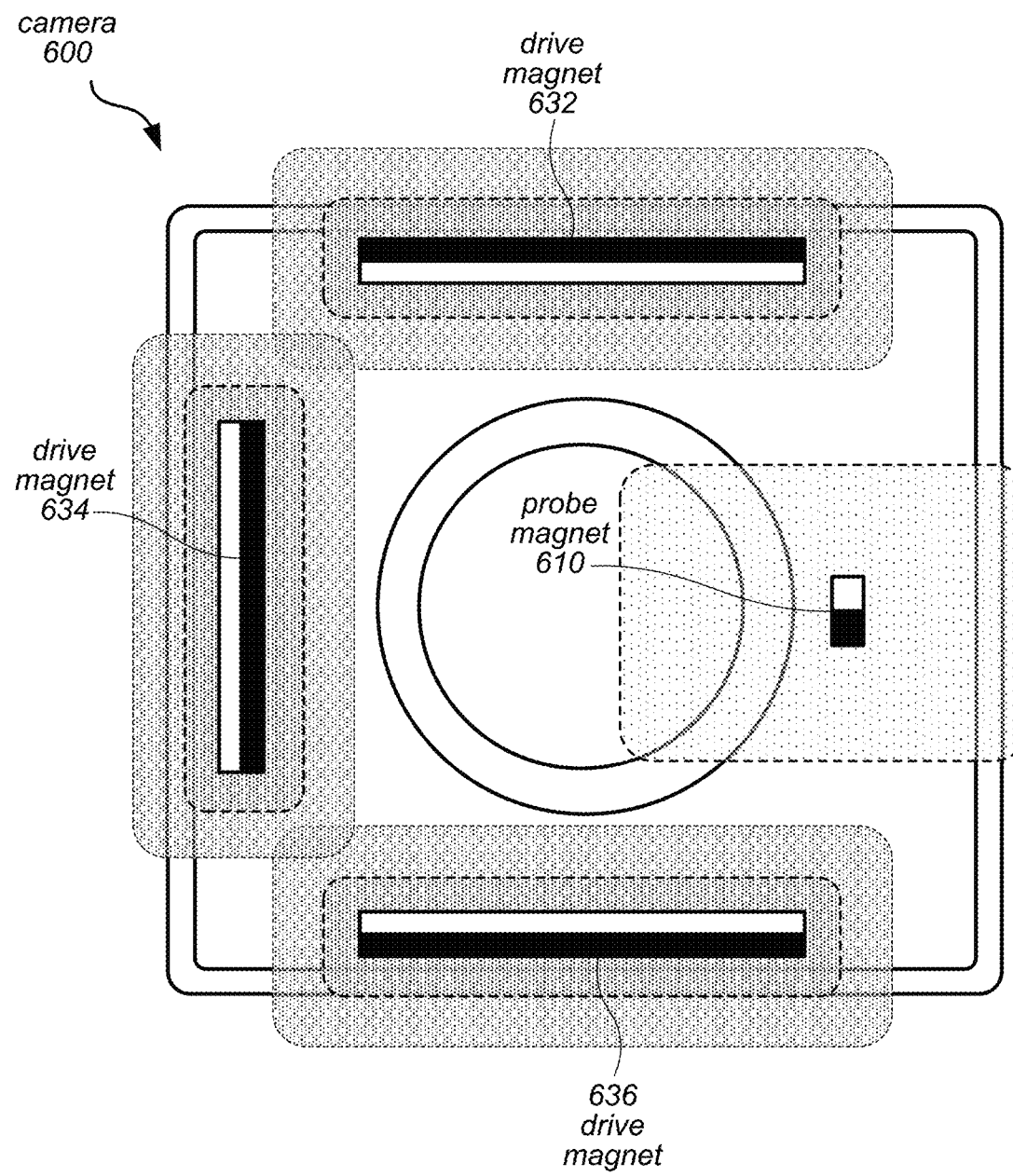

FIG. 6 illustrates another example arrangement of drive magnets and probe magnets of an actuator in a camera, according to at least some embodiments. Similar to FIG. 5, camera 600 may be a square-shaped (or near square-shaped) device that includes for corners. Drive magnets to perform movements of an optical component of camera 600 along the X, Y, or Z axes may be implemented along three different sides of camera 600, as illustrated by drive magnets 632, 634, and 636. In this way, a combination of forces provided by respective OIS coils and AF coils for drive magnets 632, 634, and 636 can push against drive magnets 632, 634, and 636 to cause the movements along the X, Y, or Z axes.

A single probe magnet 610 may be implemented to allow a corresponding position sensor for probe magnet 610 to detect changes in the flux region of probe magnet 610 in order to determine a current location of the optics component 110. For example, probe magnet 610 is located on a different side of camera 600 than the sides of the three drive magnets 632, 634, and 636. In this way, the strength of probe magnet 610 can be increased (e.g., by including a larger probe magnet than probe magnets 410, 420, 510, and 520) to increase the sensitivity of the corresponding position sensor, which could achieve a 10:1 increase in field strength of probe magnet 610 detectable by a position sensor. Thus, probe magnet 610 may be placed in a location within camera 600 such that the flux region of probe magnet 610 does not overlap with flux regions of drive magnets 632, 634, and 636. For instance, as discussed above, a flux region of a drive magnet may be an area around the drive magnet in which the field strength created by that drive magnet is at least some percentage (e.g., 10% or 1%) of the drive magnet's maximum field strength such that the area outside of the flux region of the drive magnet in which the probe magnet is placed could possibly have some non-zero field strength of the drive magnet that overlaps with the flux region of the probe magnet. In such scenarios a substrate mounted position sensor (e.g., as illustrated in FIG. 2) may be implemented. To further increase sensitivity, a position sensor for probe magnet 610 may instead utilize an OIS coil carrier placement as discussed above with regard to FIGS. 3A and 3B.

Figure 7:
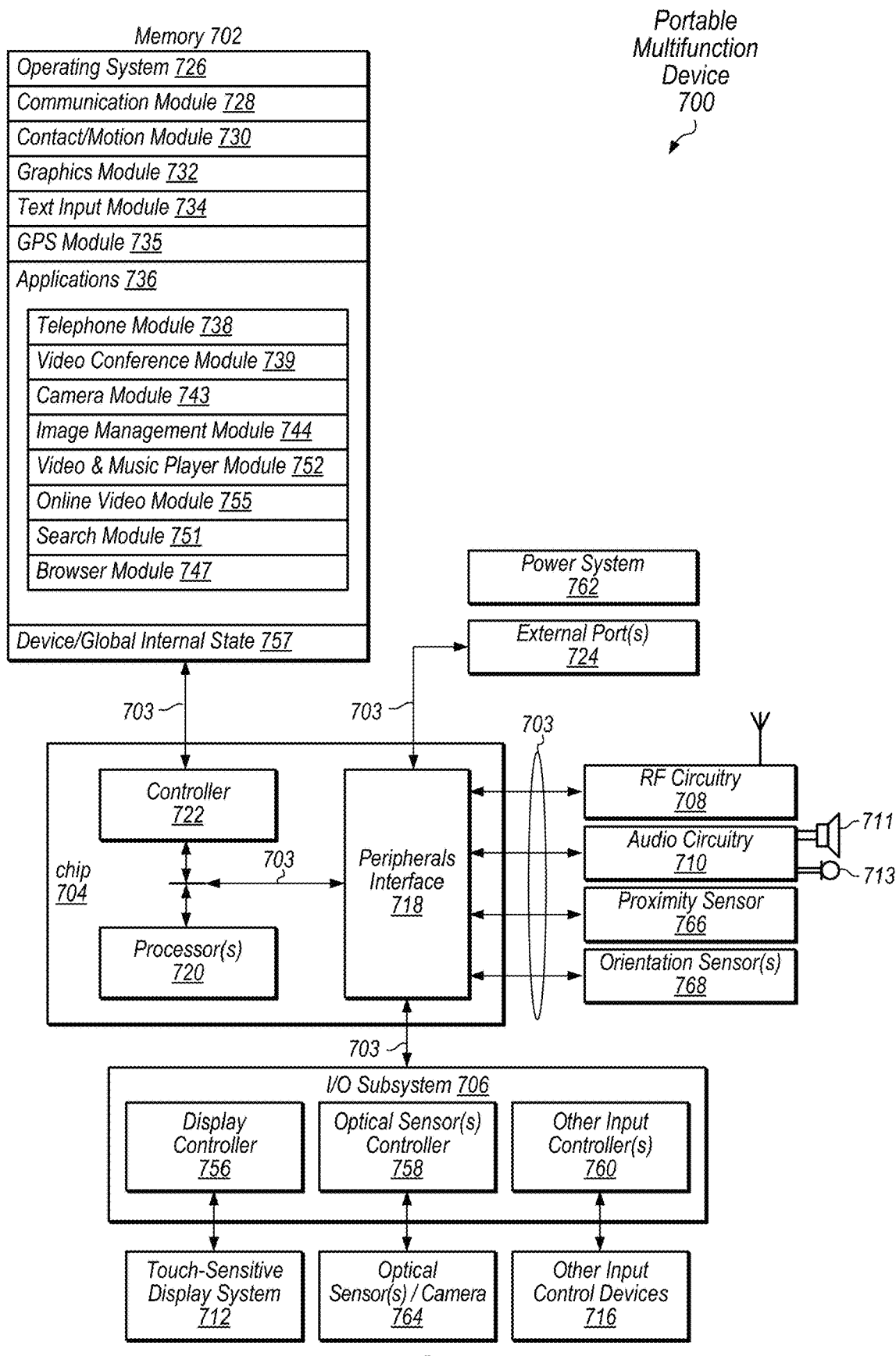
FIG. 7 illustrates a block diagram of a portable multifunction device with a camera in accordance with some embodiments.

FIG. 7 illustrates a block diagram of a portable multifunction device in accordance with some embodiments. In some embodiments, the device is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a streaming video application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 700 may include memory 702 (which may include one or more computer readable storage mediums), memory controller 722, one or more processing units (CPU's) 720, peripherals interface 718, RF circuitry 708, audio circuitry 710, speaker 711, touch-sensitive display system 712, microphone 713, input/output (I/O) subsystem 706, other input control devices 716, and external port 724. Device 700 may include one or more optical sensors or cameras 764. These components may communicate over one or more communication buses or signal lines 703.

It should be appreciated that device 700 is only one example of a portable multifunction device, and that device 700 may have more or fewer components than shown, may combine two or more components, or may have a different configuration or arrangement of the components. The various components shown in FIG. 7 may be implemented in hardware, software, or a combination of hardware and software, including one or more signal processing and/or application specific integrated circuits.

Memory 702 may include high-speed random access memory and may also include non-volatile memory, such as one or more magnetic disk storage devices, flash memory devices, or other non-volatile solid-state memory devices. Access to memory 702 by other components of device 700, such as CPU 720 and the peripherals interface 718, may be controlled by memory controller 722.

Peripherals interface 718 can be used to couple input and output peripherals of the device to CPU 720 and memory 702. The one or more processors 720 run or execute various software programs and/or sets of instructions stored in memory 702 to perform various functions for device 700 and to process data.

In some embodiments, peripherals interface 718, CPU 720, and memory controller 722 may be implemented on a single chip, such as chip 704. In some other embodiments, they may be implemented on separate chips.

RF (radio frequency) circuitry 708 receives and sends RF signals, also called electromagnetic signals. RF circuitry 708 converts electrical signals to/from electromagnetic signals and communicates with communications networks and other communications devices via the electromagnetic signals. RF circuitry 708 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 708 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 710, speaker 711, and microphone 713 provide an audio interface between a user and device 700. Audio circuitry 710 receives audio data from peripherals interface 718, converts the audio data to an electrical signal, and transmits the electrical signal to speaker 711. Speaker 711 converts the electrical signal to audible sound waves. Audio circuitry 710 also receives electrical signals converted by microphone 713 from sound waves. Audio circuitry 710 converts the electrical signal to audio data and transmits the audio data to peripherals interface 718 for processing. Audio data may be retrieved from and/or transmitted to memory 702 and/or RF circuitry 708 by peripherals interface 718. In some embodiments, audio circuitry 710 also includes a headset jack. The headset jack provides an interface between audio circuitry 710 and removable audio input/output peripherals, such as output-only headphones or a headset with both output (e.g., a headphone for one or both ears) and input (e.g., a microphone).

I/O subsystem 706 couples input/output peripherals on device 700, such as touch screen 712 and other input control devices 716, to peripherals interface 718. I/O subsystem 706 may include display controller 756 and one or more input controllers 760 for other input control devices 716. The one or more input controllers 760 receive/send electrical signals from/to other input control devices 716. The other input control devices 716 may include physical buttons (e.g., push buttons, rocker buttons, etc.), dials, slider switches, joysticks, click wheels, and so forth. In some alternative embodiments, input controller(s) 760 may be coupled to any (or none) of the following: a keyboard, infrared port, USB port, and a pointer device such as a mouse. The one or more buttons may include an up/down button for volume control of speaker 711 and/or microphone 713. The one or more buttons may include a push button.

Touch-sensitive display 712 provides an input interface and an output interface between the device and a user. Display controller 756 receives and/or sends electrical signals from/to touch screen 712. Touch screen 712 displays visual output to the user. The visual output may include graphics, text, icons, video, and any combination thereof (collectively termed "graphics"). In some embodiments, some or all of the visual output may correspond to user-interface objects.

Touch screen 712 has a touch-sensitive surface, sensor or set of sensors that accepts input from the user based on haptic and/or tactile contact. Touch screen 712 and display controller 756 (along with any associated modules and/or sets of instructions in memory 702) detect contact (and any movement or breaking of the contact) on touch screen 712 and converts the detected contact into interaction with user-interface objects (e.g., one or more soft keys, icons, web pages or images) that are displayed on touch screen 712. In an example embodiment, a point of contact between touch screen 712 and the user corresponds to a finger of the user.

Touch screen 712 may use LCD (liquid crystal display) technology, LPD (light emitting polymer display) technology, or LED (light emitting diode) technology, although other display technologies may be used in other embodiments. Touch screen 712 and display controller 756 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 712. In an example embodiment, projected mutual capacitance sensing technology is used, such as that found in the iPhone®, iPod Touch®, and iPad® from Apple Inc. of Cupertino, Calif.

Touch screen 712 may have a video resolution in excess of 100 dpi. In some embodiments, the touch screen has a video resolution of approximately 160 dpi. The user may make contact with touch screen 712 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 712, device 700 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 712 or an extension of the touch-sensitive surface formed by the touch screen.

Device 700 also includes power system 762 for powering the various components. Power system 762 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 700 may also include one or more optical sensors or cameras 764, such as camera module 100 discussed above in FIG. 1. Optical sensor 764 may, for example, include charge-coupled device (CCD) or complementary metal-oxide semiconductor (CMOS) phototransistors or photosensors (e.g., image sensor 130 in FIG. 1). Optical sensor 764 receives light from the environment, projected through one or more lenses, and converts the light to data representing an image. In conjunction with imaging module 743 (also called a camera module), optical sensor 764 may capture still images and/or video sequences. In some embodiments, at least one optical sensor may be located on the back of device 700, opposite touch screen display 712 on the front of the device. In some embodiments, the touch screen display may be used as a viewfinder for still and/or video image acquisition. In some embodiments, at least one optical sensor may instead or also be located on the front of the device.

Device 700 may also include one or more proximity sensors 766. FIG. 11 shows proximity sensor 766 coupled to peripherals interface 718. Alternatively, proximity sensor 766 may be coupled to input controller 760 in I/O subsystem 706. In some embodiments, the proximity sensor turns off and disables touch screen 712 when the multifunction device is placed near the user's ear (e.g., when the user is making a phone call).

Device 700 may also include one or more orientation sensors 768. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 700. In some embodiments, the one or more orientation sensors include any combination of orientation/rotation sensors. FIG. 11 shows the one or more orientation sensors 768 coupled to peripherals interface 718. Alternatively, the one or more orientation sensors 768 may be coupled to an input controller 760 in I/O subsystem 706. In some embodiments, information is displayed on the touch screen display in a portrait view or a landscape view based on an analysis of data received from the one or more orientation sensors.

Device 700 may also include one or more proximity sensors 766. FIG. 7 shows proximity sensor 766 coupled to peripherals interface 718. Alternatively, proximity sensor 766 may be coupled to input controller 760 in I/O subsystem 706. In some embodiments, the proximity sensor turns off and disables touch screen 712 when the multifunction device is placed near the user's ear (e.g., when the user is making a phone call).

Device 700 may also include one or more orientation sensors 768. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 700. In some embodiments, the one or more orientation sensors include any combination of orientation/rotation sensors. FIG. 7 shows the one or more orientation sensors 768 coupled to peripherals interface 718. Alternatively, the one or more orientation sensors 768 may be coupled to an input controller 760 in I/O subsystem 706. In some embodiments, information is displayed on the touch screen display in a portrait view or a landscape view based on an analysis of data received from the one or more orientation sensors.

In some embodiments, the software components stored in memory 702 include operating system 726, communication module 728, contact/motion module (or set of instructions) 730, graphics module 732, text input module 734, Global Positioning System (GPS) module 735, and applications 736. Furthermore, in some embodiments memory 702 stores device/global internal state 757. Device/global internal state 757 includes one or more of: active application state, indicating which applications, if any, are currently active; display state, indicating what applications, views or other information occupy various regions of touch screen display 712; sensor state, including information obtained from the device's various sensors and input control devices 716; and location information concerning the device's location and/or attitude.

Operating system 726 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 728 facilitates communication with other devices over one or more external ports 724 and also includes various software components for handling data received by RF circuitry 708 and/or external port 724. External port 724 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 730 may detect contact with touch screen 712 (in conjunction with display controller 756) and other touch sensitive devices (e.g., a touchpad or physical click wheel). Contact/motion module 730 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 730 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, contact/motion module 730 and display controller 756 detect contact on a touchpad.

Contact/motion module 730 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 732 includes various software components for rendering and displaying graphics on touch screen 712 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 732 stores data representing graphics to be used. Each graphic may be assigned a corresponding code. Graphics module 732 receives, from applications etc., one or more codes specifying graphics to be displayed along with, if necessary, coordinate data and other graphic property data, and then generates screen image data to output to display controller 756.

Text input module 734, which may be a component of graphics module 732, provides soft keyboards for entering text in various applications that need text input.

GPS module 735 determines the location of the device and provides this information for use in various applications (e.g., to telephone module 738 for use in location-based dialing, to camera module 743 as picture/video metadata, and to applications that provide location-based services such as map/navigation applications).

Applications 736 may include one or more of, but are not limited to, the following modules (or sets of instructions), or a subset or superset thereof:
  telephone module 738;
  video conferencing module 739;
  camera module 743 for still and/or video imaging;
  image management module 744;
  browser module 747;
  search module 751;
  video and music player module 752, which may be made up of a video player module and a music player module; and/or
  online video module 755.
  one or more other modules not shown, such as a gaming module.

Examples of other applications 736 that may be stored in memory 702 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 708, audio circuitry 710, speaker 711, microphone 713, touch screen 712, display controller 756, contact module 730, graphics module 732, and text input module 734, telephone module 738 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 708, audio circuitry 710, speaker 711, microphone 713, touch screen 712, display controller 756, optical sensor 764, optical sensor controller 758, contact/motion module 730, graphics module 732, text input module 734, and telephone module 738, videoconferencing module 739 includes executable instructions to initiate, conduct, and terminate a video conference between a user and one or more other participants in accordance with user instructions.

In conjunction with touch screen 712, display controller 756, optical sensor(s) 764, optical sensor controller 758, contact/motion module 730, graphics module 732, and image management module 744, camera module 743 includes executable instructions to capture still images or video (including a video stream) and store them into memory 702, modify characteristics of a still image or video, or delete a still image or video from memory 702.

In conjunction with touch screen 712, display controller 756, contact/motion module 730, graphics module 732, text input module 734, and camera module 743, image management module 744 includes executable instructions to arrange, modify (e.g., edit), or otherwise manipulate, label, delete, present (e.g., in a digital slide show or album), and store still and/or video images.

In conjunction with RF circuitry 708, touch screen 712, display system controller 756, contact/motion module 730, graphics module 732, and text input module 734, browser module 747 includes executable instructions to browse the Internet in accordance with user instructions, including searching, linking to, receiving, and displaying web pages or portions thereof, as well as attachments and other files linked to web pages.

In conjunction with touch screen 712, display system controller 756, contact/motion module 730, graphics module 732, and text input module 734, search module 751 includes executable instructions to search for text, music, sound, image, video, and/or other files in memory 702 that match one or more search criteria (e.g., one or more user-specified search terms) in accordance with user instructions.

In conjunction with touch screen 712, display system controller 756, contact/motion module 730, graphics module 732, audio circuitry 710, speaker 711, RF circuitry 708, and browser module 747, video and music player module 752 includes executable instructions that allow the user to download and play back recorded music and other sound files stored in one or more file formats, such as MP3 or AAC files, and executable instructions to display, present or otherwise play back videos (e.g., on touch screen 712 or on an external, connected display via external port 724). In some embodiments, device 700 may include the functionality of an MP3 player, such as an iPod (trademark of Apple Inc.).

In conjunction with touch screen 712, display system controller 756, contact/motion module 730, graphics module 732, audio circuitry 710, speaker 711, RF circuitry 708, text input module 734, and browser module 747, online video module 755 includes instructions that allow the user to access, browse, receive (e.g., by streaming and/or download), play back (e.g., on the touch screen or on an external, connected display via external port 724), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 702 may store a subset of the modules and data structures identified above. Furthermore, memory 702 may store additional modules and data structures not described above.

In some embodiments, device 700 is a device where operation of a predefined set of functions on the device is performed exclusively through a touch screen and/or a touchpad. By using a touch screen and/or a touchpad as the primary input control device for operation of device 700, the number of physical input control devices (such as push buttons, dials, and the like) on device 700 may be reduced.

The predefined set of functions that may be performed exclusively through a touch screen and/or a touchpad include navigation between user interfaces. In some embodiments, the touchpad, when touched by the user, navigates device 700 to a main, home, or root menu from any user interface that may be displayed on device 700. In such embodiments, the touchpad may be referred to as a "menu button." In some other embodiments, the menu button may be a physical push button or other physical input control device instead of a touchpad.

Figure 8:
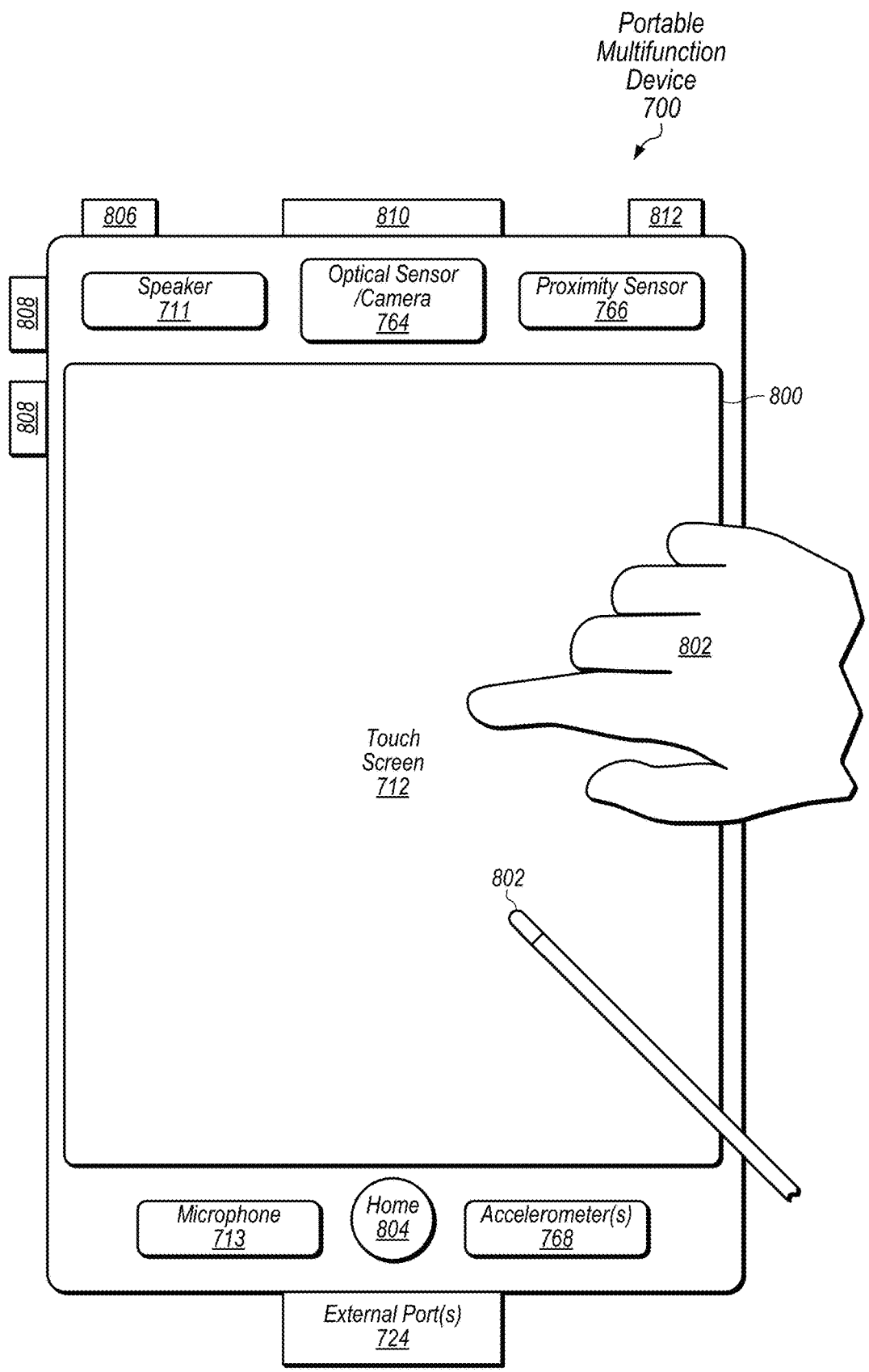
FIG. 8 depicts a portable multifunction device having a camera in accordance with some embodiments.

FIG. 8 illustrates a portable multifunction device 700 having a touch screen 712 in accordance with some embodiments. The touch screen may display one or more graphics within user interface (UI) 800. In at least some embodiments of a device 700, a user may select one or more of the graphics by making a gesture on the graphics, for example, with one or more fingers 802 (not drawn necessarily drawn to scale in the figure) or one or more styluses 803 (not necessarily drawn to scale in the figure).

Device 700 may also include one or more physical buttons, such as a "home" or menu button 804. As described previously, menu button 804 may be used to navigate to any application 736 in a set of applications that may be executed on device 700. Alternatively, in some embodiments, the menu button is may be implemented as a soft key in a GUI displayed on touch screen 712.

In one some embodiments, device 700 includes touch screen 712, home or menu button 804, push button 806 for powering the device on/off and locking the device, volume adjustment button(s) 808, Subscriber Identity Module (SIM) card slot 810, head set jack 812, and docking/charging external port 724. Push button 806 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 700 also may accept verbal input for activation or deactivation of some functions through microphone 713.

Device 700 may also include one or more cameras 764. A camera 764 may, for example, include charge-coupled device (CCD) or complementary metal-oxide semiconductor (CMOS) phototransistors or photosensors. A camera 764 receives light from the environment, projected through one or more lenses, and converts the light to data representing an image or video frame. In some embodiments, at least one camera 764 may be located on the back of device 700, opposite touch screen display 712 on the front of the device. In some embodiments, at least one camera 764 may instead or also be located on the front of the device with the touch screen display 712, for example so that the user's image may be obtained for videoconferencing while the user views the other video conference participants on the touch screen display 712. In some embodiments, at least one camera 764 may be located on the front of the device 700, and at least one camera 764 may be located on the back of the device 700. In some embodiments, the touch screen display 712 may be used as a viewfinder and/or user interface for still image and/or video sequence acquisition applications.

Device 700 may include video and image processing hardware and/or software, including but not limited to video encoding and/or decoding components, codecs, modules, or pipelines, that may be used to capture, process, convert, compress, decompress, store, modify, transmit, display, and otherwise manage and manipulate still images and/or video frames or video sequences captured via camera 764 or otherwise acquired (e.g., via a network interface). In some embodiments, device 700 may also include one or more light or other sensors that may be used to collect ambient lighting or other metrics from the environment of the device 700 for use in video and image capture, processing, and display.

Those skilled in the art will appreciate that portable multifunction device 700 is merely illustrative and is not intended to limit the scope of embodiments. In particular, the portable multifunction device and camera devices may include any combination of hardware or software that can perform the indicated functions, including computers, network devices, Internet appliances, PDAs, wireless phones, pagers, etc. Portable multifunction device 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   an image sensor configured to capture light projected onto a surface of the image sensor through an optics component;
   the optics component, configured to:
   move along an optical axis of the optics component to allow an actuator comprising one or more drive magnets to cause the optics component to move along the optical axis; and
   move along one or more axes orthogonal to the optical axis to allow the actuator to cause the optics component to move along the one or more axes;
   the actuator, comprising an optical image stabilization (OIS) coil configured to cause one of the one or more drive magnets to move along the one or more axes orthogonal to the optical axis;
   a probe magnet mounted on a surface of the optics component; and
   a position sensor located within the flux region of the probe magnet, configured to detect changes in a current location of the probe magnet as the probe magnet moves along with the optics component responsive to the actuator according to changes in the flux region of the probe magnet, and wherein the position sensor is mounted on an image sensor side surface of a carrier of the OIS coil.
2. The camera of claim 1, wherein the OIS coil is mounted on the surface of the carrier.
3. The camera of claim 1, wherein the flux region of the probe magnet does not overlap with respective flux regions of the one or more drive magnets.
4. The camera of claim 1, wherein the one or more drive magnets are positioned at an angle with respect to four different corners of the camera and wherein the probe magnet is located along a side of the camera between two of the one or more drive magnets.
5. The camera of claim 1, wherein the one or more drive magnets are located at three different sides of the camera and wherein the probe magnet is located at a fourth side of the camera different than the three sides of the one or more drive magnets.
6. The camera of claim 1, wherein the camera is implemented within a portable multifunction device.
7. The camera of claim 1, wherein the camera also implements an autofocus (AF) mechanism to cause the actuator to move the optical component along the optical axis and an OIS mechanism to cause the actuator to move the optical component along a path orthogonal to the optical path.
8. A device comprising, comprising:
   one or more processors;
   a memory, storing program instructions that cause the one or more processors to implement a controller to signal an actuator of a camera to cause movement of an optics component of the camera;
   the camera, comprising:
   the actuator, comprising
   one or more drive magnets;
   one or more coils configured to move the one or more drive magnets according to Lorentz forces generated when an electric current is applied to the one or more coils;
   a probe magnet mounted on a surface of the optics component; and
   a position sensor located within the flux region of the probe magnet, configured to detect changes in a current location of the probe magnet as the probe magnet moves along with the optics component responsive to the actuator according to changes in the flux region of the probe magnet, and wherein the position sensor is mounted on a surface of a carrier of one of the one or more coils, wherein the position sensor is mounted on an image sensor side of the carrier of one of the one or more coils.
9. The device of claim 8, wherein the flux region of the probe magnet does not overlap with respective flux regions of the one or more drive magnets.
10. The device of claim 8, wherein the one or more drive magnets are positioned at an angle with respect to four different corners of the camera, wherein the camera further comprises a second probe magnet mounted in a different location on the optics component than the probe magnet, wherein the camera further comprises a second position sensor configured to detect changes in a current location of the second probe magnet, wherein the second probe magnet is mounted on a surface of a carrier for a second one of the one or more coils, and wherein the position sensor and the second position sensor are located between different ones of the drive magnets positioned on opposite sides of the camera.
11. The device of claim 8, wherein the one or more drive magnets are located at three different sides of the camera, wherein the camera further comprises a second probe magnet mounted in a different location on the optics component than the probe magnet, wherein the camera further comprises a second position sensor configured to detect changes in a current location of the second probe magnet, wherein the second probe magnet is mounted on a surface of a carrier for a second one of the one or more coils, and wherein the position sensor and the second position sensor are located adjacent to drive magnets positioned on opposite ones of the three different sides of the camera.

12. The device of claim 8, wherein the carrier of the one coil is a carrier for an optical image stabilization (OIS) coil.

13. The camera of claim 12, wherein the camera also implements an autofocus (AF) mechanism to cause the actuator to move the optical component along the optical axis and an OIS mechanism to cause the actuator to move the optical component along a path orthogonal to the optical path.

14. The device of claim 8, wherein the device is a portable multifunction device.

15. The device of claim 8, wherein the device further comprises a display configured to display image data capture via the image sensor of the camera.

16. A camera, comprising:
    an image sensor configured to capture light projected onto a surface of the image sensor through an optics component;
    the optics component, configured to:
    move along an optical axis of the optics component to allow an actuator comprising one or more drive magnets to cause the optics component to move along the optical axis; and
    move along one or more axes orthogonal to the optical axis to allow the actuator to cause the optics component to move along the one or more axes;
    a probe magnet mounted on a surface of the optics component in a location where a flux region of the probe magnet does not overlap with respective flux regions of the one or more drive magnets; and
    a position sensor located within the flux region of the probe magnet, configured to detect changes in a current location of the probe magnet as the probe magnet moves along with the optics component responsive to the actuator according to changes in the flux region of the probe magnet, wherein the position sensor is mounted on an image sensor side surface of a carrier for one or more coils in the actuator configured to move the one or more drive magnets according to Lorentz forces generated when an electric current is applied to the one or more coils.

17. The camera of claim 16, wherein the one or more coils in the actuator is an optical image stabilization (OIS) coil.

18. The camera of claim 17, wherein the OIS coil is embedded within the carrier.

19. The camera of claim 16, wherein the one or more drive magnets are located at three different sides of the camera and wherein the probe magnet is located at a fourth side of the camera different than the three sides of the one or more drive magnets.

20. The camera of claim 16, wherein the camera is implemented within a portable multifunction device that also implements an autofocus (AF) mechanism to cause the actuator to move the optical component along the optical axis and an optical image stabilization (OIS) mechanism to cause the actuator to move the optical component along a path orthogonal to the optical path.

* * * * *